United States Patent
Kawakami

(10) Patent No.: US 12,502,958 B2
(45) Date of Patent: Dec. 23, 2025

(54) VEHICLE DISPLAY CONTROL DEVICE

(71) Applicant: TOYOTA JIDOSHA KABUSHIKI KAISHA, Toyota (JP)

(72) Inventor: Masaru Kawakami, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 142 days.

(21) Appl. No.: 18/612,235

(22) Filed: Mar. 21, 2024

(65) Prior Publication Data

US 2025/0033475 A1  Jan. 30, 2025

(30) Foreign Application Priority Data

Jul. 27, 2023 (JP) ................... 2023-122226

(51) Int. Cl.
| | |
|---|---|
| *B60K 35/22* | (2024.01) |
| *B60K 35/28* | (2024.01) |
| *B60K 35/81* | (2024.01) |
| *B60W 30/16* | (2020.01) |
| *B60W 50/14* | (2020.01) |

(52) U.S. Cl.
CPC ............. *B60K 35/22* (2024.01); *B60K 35/28* (2024.01); *B60K 35/81* (2024.01); *B60W 30/16* (2013.01); *B60W 50/14* (2013.01); *B60W 2050/146* (2013.01); *B60W 2520/10* (2013.01)

(58) Field of Classification Search
CPC ........ B60K 35/22; B60K 35/81; B60K 35/28; B60K 2031/0033; B60W 30/16; B60W 50/14; B60W 2050/146; B60W 2520/10; B60T 8/1755; B60L 7/00; G08G 1/00; B60Q 9/00

USPC ........................................................... 701/36
See application file for complete search history.

(56) References Cited

U.S. PATENT DOCUMENTS

| | | |
|---|---|---|
| 9,964,950 B2 | 5/2018 | Takano |
| 10,017,116 B2 | 7/2018 | Sato |
| 10,310,508 B2 | 6/2019 | Kunisa et al. |

(Continued)

FOREIGN PATENT DOCUMENTS

| | | | | |
|---|---|---|---|---|
| EP | 4074567 A1 | * | 10/2022 | .......... B60W 30/143 |
| EP | 4206612 A1 | * | 7/2023 | .......... G01C 21/3407 |

(Continued)

OTHER PUBLICATIONS

Anup et al., "A Novel Active Heads-Up Display for Driver Assistance," 2009, vol. 39; Publisher: IEEE.*

*Primary Examiner* — Tuan C To
(74) *Attorney, Agent, or Firm* — SoraIP, Inc.

(57) ABSTRACT

The vehicle display control device includes a control unit capable of executing a travel assist control for causing the vehicle to travel so that the vehicle speed coincides with the set vehicle speed or the vehicle follows the preceding vehicle, and a display device in which a status display element relating to an operating status of the travel assist control is displayed in a preset display area. The control unit is configured to set a display area to a first area when neither a first condition that travel assist control is on nor a second condition that the vehicle is traveling on an expressway is satisfied, and to set the display area to a second area when either or both of the first condition and the second condition are satisfied. The second area is set at a position that is more visible to a driver than the first area.

5 Claims, 5 Drawing Sheets

(56) References Cited

U.S. PATENT DOCUMENTS

| | | |
|---|---|---|
| 10,452,930 B2 | 10/2019 | Sato |
| 10,663,973 B2 | 5/2020 | Hashimoto et al. |
| 10,895,875 B2 | 1/2021 | Hashimoto et al. |
| 11,001,198 B2 | 5/2021 | Morimura et al. |
| 11,275,382 B2 | 3/2022 | Hashimoto et al. |
| 2013/0110315 A1* | 5/2013 | Ogawa ............ G08G 1/096716 701/1 |
| 2013/0110316 A1* | 5/2013 | Ogawa ............ G08G 1/096725 701/1 |
| 2020/0290624 A1* | 9/2020 | Kumano ............ B60W 60/0011 |
| 2021/0229598 A1 | 7/2021 | Morimura et al. |
| 2021/0380124 A1 | 12/2021 | Urano et al. |
| 2022/0118975 A1* | 4/2022 | Kim ................. B60W 50/0205 |
| 2024/0326854 A1* | 10/2024 | Nishiguchi ........... B60W 50/14 |

FOREIGN PATENT DOCUMENTS

| | | |
|---|---|---|
| JP | H11-042957 A | 2/1999 |
| JP | 2010-097455 A | 4/2010 |
| JP | 2011-098616 A | 5/2011 |
| JP | 2014-215698 A | 11/2014 |

* cited by examiner

VEHICLE DISPLAY CONTROL DEVICE

CROSS-REFERENCE TO RELATED APPLICATION

This application claims priority to Japanese Patent Application No. 2023-122226 filed on Jul. 27, 2023, incorporated herein by reference in its entirety.

BACKGROUND

1. Technical Field

The present disclosure relates to vehicle display control devices that display, on a display device, a status display element related to the operating status of travel assist control for controlling a vehicle to travel so that its vehicle speed matches a set vehicle speed or so that the vehicle follows a preceding vehicle.

2. Description of Related Art

Vehicles that perform this travel assist control (sometimes referred to as "adaptive cruise control (ACC)") are conventionally known in the art. For example, a vehicle display control device described in Japanese Unexamined Patent Application Publication No. 11-42957 (JP 11-42957 A) (hereinafter referred to as "conventional device") keeps a cruise power light at the right end of a meter display on while the travel assist control is on. The cruise power light indicates the operating status of the travel assist control. The cruise power light is sometimes referred to as "status display element".

SUMMARY

In the conventional device, the status display element is located at the right end of the meter display. The ends of a display are typically less visible than the central part of the display. Therefore, the above configuration reduces the possibility of a driver being bothered by the status display element in a situation where the driver is less likely to look at the status display element. However, the above configuration is more likely to make it harder for the driver to see the status display element in a situation where the driver is more likely to look at the status display element.

The present disclosure was made to address the above-mentioned issue. That is, it is one object of the present disclosure to provide a vehicle display control device that reduces the possibility of a driver being bothered by a status display element and increases the possibility of the driver being able to easily see the status display element.

The vehicle display control device of the present disclosure (hereinafter, referred to as "device of the present disclosure") includes: a control unit (20) configured to perform travel assist control for controlling a vehicle to travel in such a manner that a vehicle speed indicating a speed of the vehicle matches a preset set vehicle speed or that the vehicle follows a preceding vehicle; and a display device (44) configured to display, in a preset display area (58 or 60), a status display element (54) related to an operating status of the travel assist control. The control unit is configured to set the display area to a first area (step 515) when neither a first condition nor a second condition is satisfied ("No" in step 505 and "No" in step 510), the first condition being that the travel assist control is on, and the second condition being that the vehicle is traveling on an expressway, and set the display area to a second area (step 545) when either or both of the first condition and the second condition are satisfied ("Yes" in step 505 or "Yes" in step 510). The second area is set at a position that is more visible to a driver than the first area.

When the vehicle is traveling on an expressway, there is a high possibility that the driver may cause the control unit to perform the travel assist control. Therefore, when the vehicle is traveling on an expressway, the driver is more likely to look at the status display element. When the control unit is performing the travel assist control, the driver is also more likely to look at the status display element. According to the device of the present disclosure, when the travel assist control is on and/or when the vehicle is traveling on an expressway, the status display element is displayed in the second area that is more visible than the first area. It is therefore possible to reduce the possibility of the driver being bothered by the status display element and increase the possibility of the driver being able to easily see the status display element.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
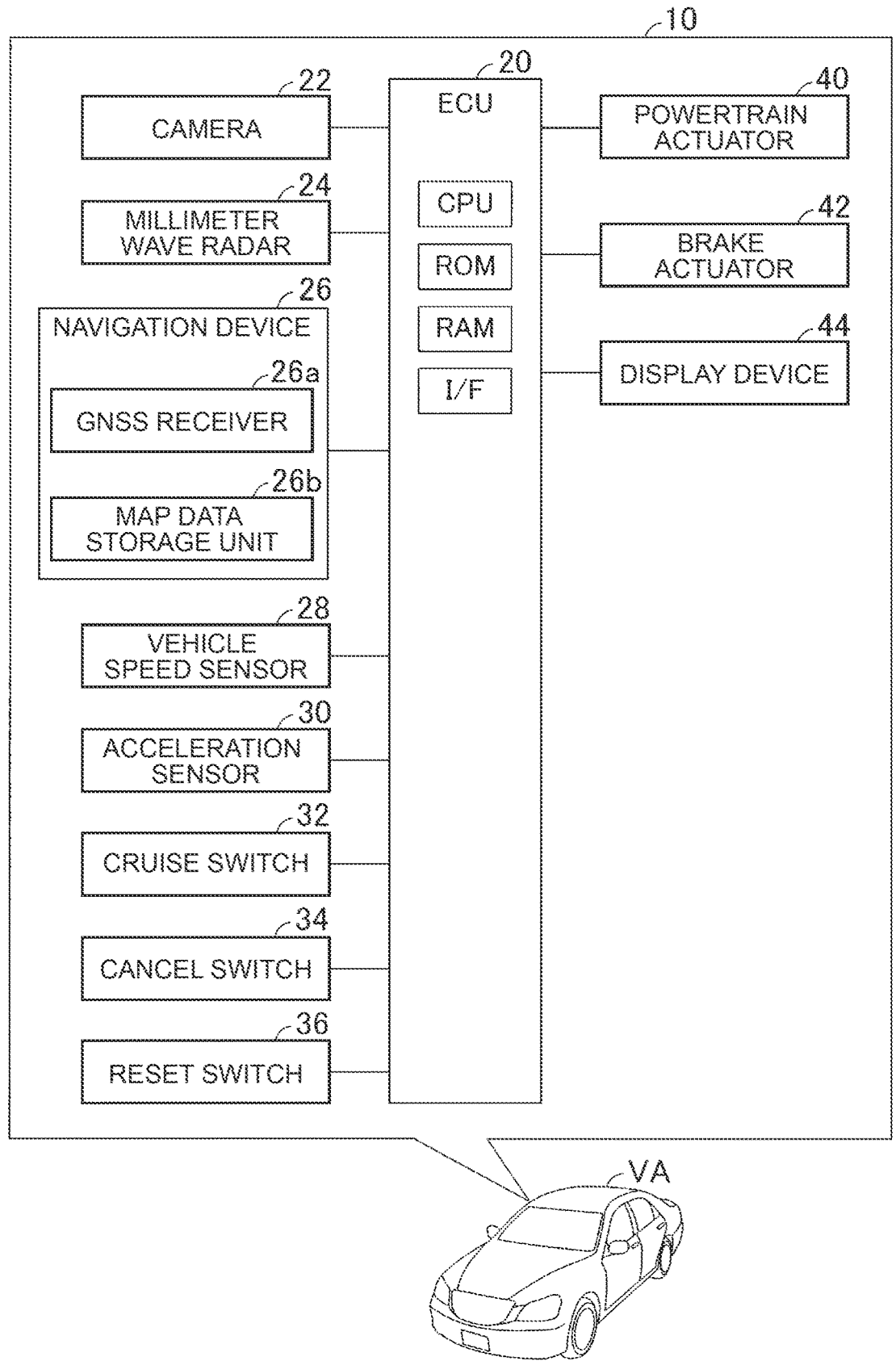
FIG. 1 is a schematic system configuration diagram of a vehicle display control device according to an embodiment of the present disclosure.

As illustrated in FIG. 1, a vehicle display control device 10 (hereinafter, referred to as "device 10") according to the present embodiment is applied to a vehicle VA and includes the components illustrated in FIG. 1.

The ECU 20 performs travel assist control that is a kind of automated driving. In the travel assist control, the ECU 20 performs constant speed control when there is no preceding vehicle in front of the vehicle VA, and performs following control when there is a preceding vehicle in front of the vehicle VA. The constant speed control is a control for controlling the vehicle VA to travel such that the vehicle speed Vs indicating the speed of the vehicle VA matches the set vehicle speed Vset. The following control is a control for controlling the vehicle VA to travel such that the distance D between the preceding vehicle and the vehicle VA matches the set distance Dset. Such travel assist control is known as adaptive cruise control (ACC) and cruise control.

In the present specification, the "ECU 20" is an electronic control device including a microcomputer as a main part. The ECU 20 are also referred to as control units, controllers and computers. The microcomputer includes a CPU (processor), a ROM, RAM, interfaces, and the like. The functions implemented by the ECU 20 may be implemented by a plurality of ECUs.

The camera 22 captures an image of a scene in front of the vehicle VA. The ECU 20 acquires images from the camera 22.

The millimeter wave radar 24 transmits millimeter waves forward of the vehicle VA. The millimeter wave radar 24 identifies the "position of the object with respect to the vehicle VA" and the "relative velocity Vr of the target with respect to the vehicle VA" by receiving the reflected wave reflected by the object by the transmitted millimeter wave. The ECU 20 obtains radar object information from the millimeter-wave radar 24, including the position and the relative velocity Vr of the object with respect to the vehicle VA.

The navigation device 26 includes a GNSS receiver 26a and a map-data storage unit 26b. The GNSS receiver 26a receives signals from a plurality of satellites and identifies the present position (latitude and longitude) of the vehicle VA based on the received signals. The map data storage unit 26b stores map data. In the map data, type information for identifying whether the road is a general road or an expressway is registered.

The vehicle speed sensor 28 detects the vehicle speed Vs. The acceleration sensor 30 detects an acceleration G in the front-rear axial direction of the vehicle VA. The ECU 20 obtains the detections of these sensors.

The cruise switch 32 is operated by the driver to start the travel assist control or to end the travel assist control. The cancel switch 34 is operated by the driver to interrupt the travel assist control. The reset switch 36 is operated by the driver to resume the travel assist control when the travel assist control is interrupted.

The powertrain actuator 40 changes a driving force generated by a driving device (for example, an internal combustion engine and/or an electric motor) of the vehicle VA. The brake actuator 42 controls a braking force applied to the vehicle VA. The display device 44 is disposed on an instrument panel of the vehicle VA.

Figure 2A:
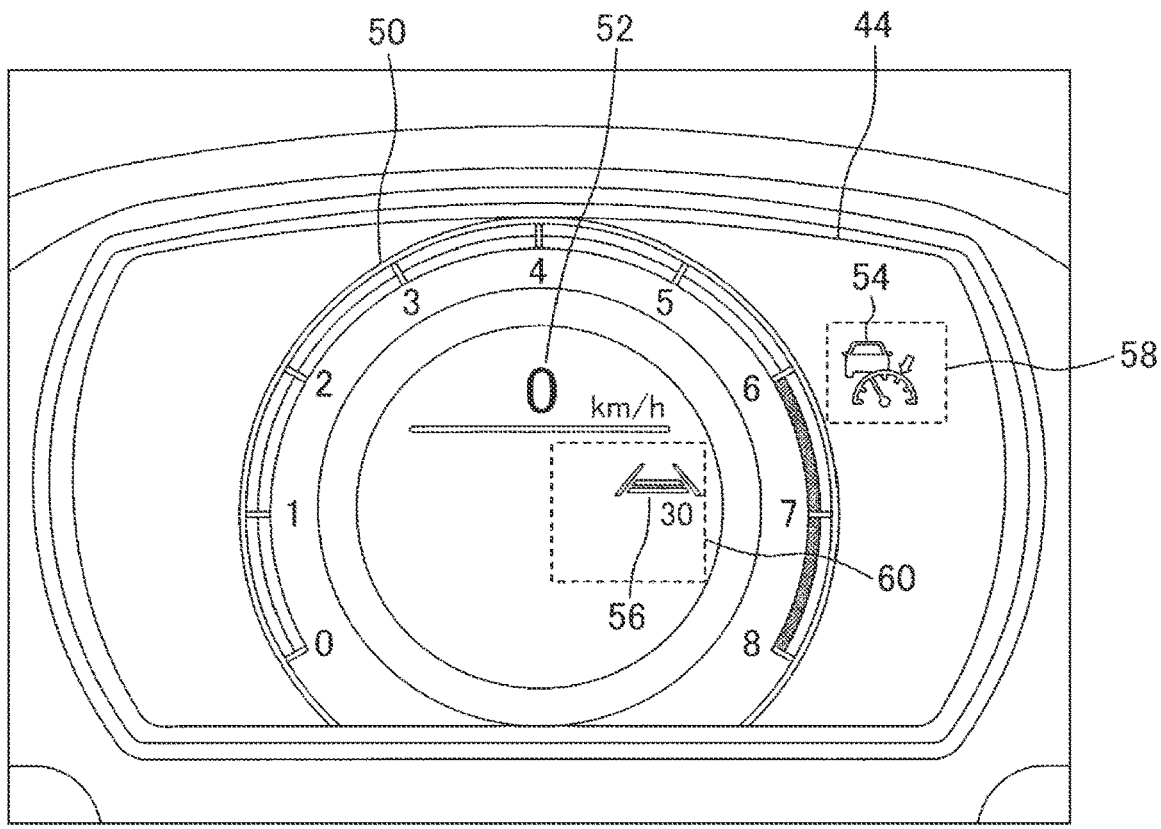
FIG. 2A illustrates the display device shown in FIG. 1 when a status display element is displayed in a first area.
Figure 2B:
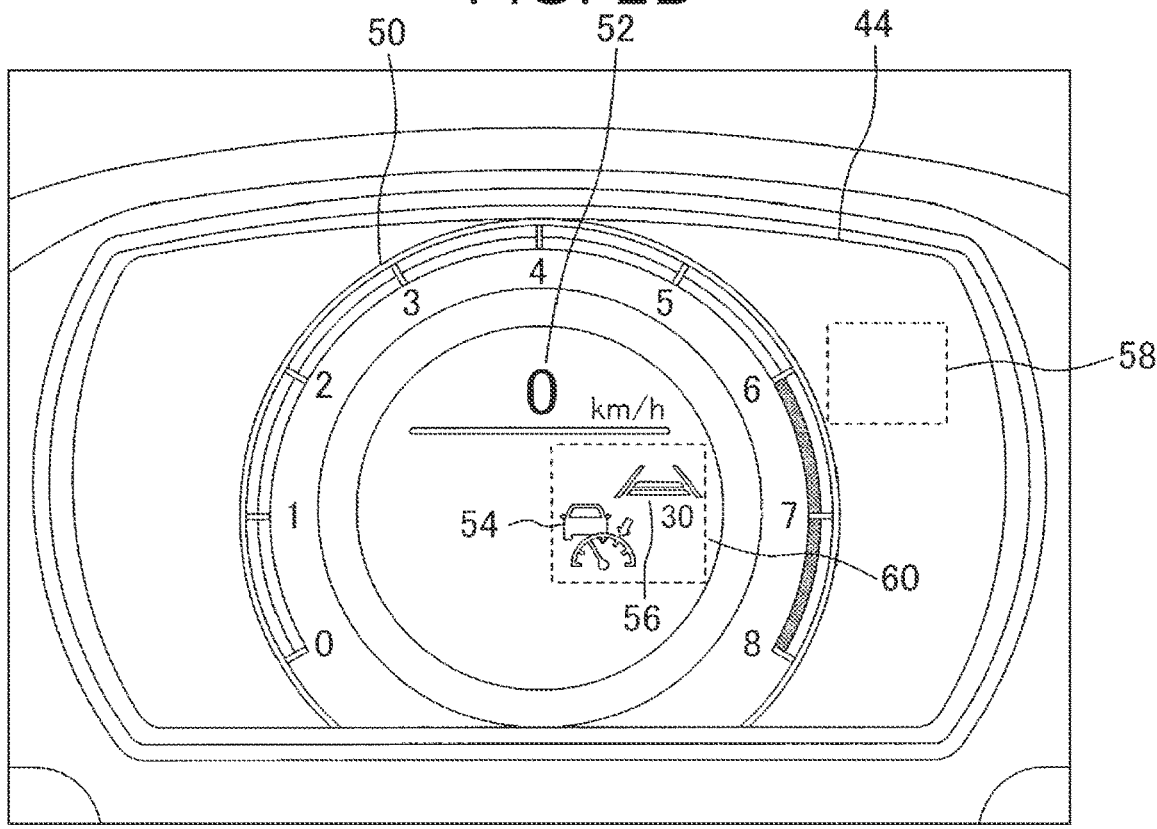
FIG. 2B illustrates the display device shown in FIG. 1 when the status display element is displayed in a second area.

As shown in FIGS. 2A and 2B, the display device 44 displays a tachometer 50, a digital speedometer 52, a cruise status indicator light 54, and a cruise setting indicator light 56.

The tachometer 50 is displayed near the center of the display device 44 and has a circular shape. The tachometer 50 displays any one of the number of revolutions of the internal combustion engine, the hybrid system indicator, and the speedometer. These are switched based on the setting of the driver or the like. In FIGS. 2A and 2B, the tachometer 50 displays the rotational speed of the internal combustion engine.

The digital speedometer 52 displays the vehicle speed Vs as a number.

The cruise status indicator light 54 turns green in a period from the start to the end of the travel assist control (that is, a period in which the travel assist control is on). When the travel assist control is interrupted due to the predetermined interruption condition being satisfied during the period in which the travel assist control is on, the cruise status indicator light 54 turns white. When any one of the condition that the driver has operated an accelerator pedal (not shown), the condition that the driver has operated a brake pedal (not shown), and the condition that the driver has operated the cancel switch 34 is satisfied, the interruption condition is satisfied. When the driver operates the reset switch 36 to resume the travel assist control, the cruise status indicator light 54 turns green again. As described above, the cruise status indicator light 54 indicates the operating status of the travel assist control, and therefore may be referred to as a "status display element".

The cruise setting indicator light 56 is displayed inside the tachometer 50 and lights up in a period from the start to the end of the travel assist control. The cruise setting indicator light 56 displays the currently set "set vehicle speed Vset and set distance Dset". In FIGS. 2A and 2B, the set vehicle speed Vset is set to "30 km/h", and "30" is displayed on the cruise setting indicator light 56. Further, in the cruise setting indicator light 56, the set distance Dset is displayed as two horizontal lines. The larger the number of horizontal lines, the longer the set-distance Dset. The set distance Dset varies according to the vehicle speed Vs, and becomes longer as the vehicle speed Vs is higher. The cruise setting indicator light 56 displays setting information related to the travel assist control, and therefore may be referred to as a "setting display element".

Overview of Operation

ECU 20 of the device 10 sets a display area for displaying the cruise status indicator light 54 in the first area 58 when neither the first condition nor the second condition below is satisfied. In this instance, as shown in FIG. 2A, ECU 20 displays the cruise status indicator light 54 in the first area 58. On the other hand, when either or both of the first condition and the second condition are satisfied, ECU 20 sets the displaying area in the second area 60. In this instance, as shown in FIG. 2B, ECU 20 displays the cruise status indicator light 54 in the second area 60.

First Condition: Travel assist control is on.
Second Condition: The vehicle VA is traveling on the highway.

The second area 60 is closer to the center of the display device 44 than the first area 58. More specifically, the second area 60 is located inside the tachometer 50, and the first area 58 is located outside the tachometer 50. Therefore, the second area 60 is set in advance at a position that is more visible to the driver than the first area 58.

When the travel assist control is on, the driver is more likely to look at the cruise status indicator light 54. Moreover, the possibility that the travel assist control is performed is higher when the vehicle VA is traveling on an expressway than when the vehicle VA is traveling on a local road. Therefore, when the vehicle VA is traveling on an expressway, the driver is more likely to look at the cruise status indicator light 54. Therefore, when either or both of the first condition and the second condition are satisfied, the driver is more likely to look at the cruise status indicator light 54 than when neither the first condition nor the second condition is satisfied. The device 10 displays the cruise status indicator light 54 in the more visible second area 60 when the driver is more likely to look at the cruise status indicator light 54, and displays the cruise status indicator light 54 in the less visible second area 60 when the driver is less likely to look at the cruise status indicator light 54. Therefore, it is possible to reduce the possibility of the driver being bothered by the cruise status indicator light 54 and increase the possibility of the driver being able to easily see the cruise status indicator light 54.

Further, as shown in FIGS. 2A and 2B, a cruise setting indicator light 56 is displayed in the second area 60. Therefore, when either or both of the first condition and the second condition are satisfied, the cruise setting indicator light 56 and the cruise status indicator light 54 are collectively displayed in the second area 60, as shown in FIG. 2B. Therefore, the driver can recognize information on the operating status of the travel assist control and the settings of the travel assist control by looking at the second area 60.

Specific Operation

Figure 3:
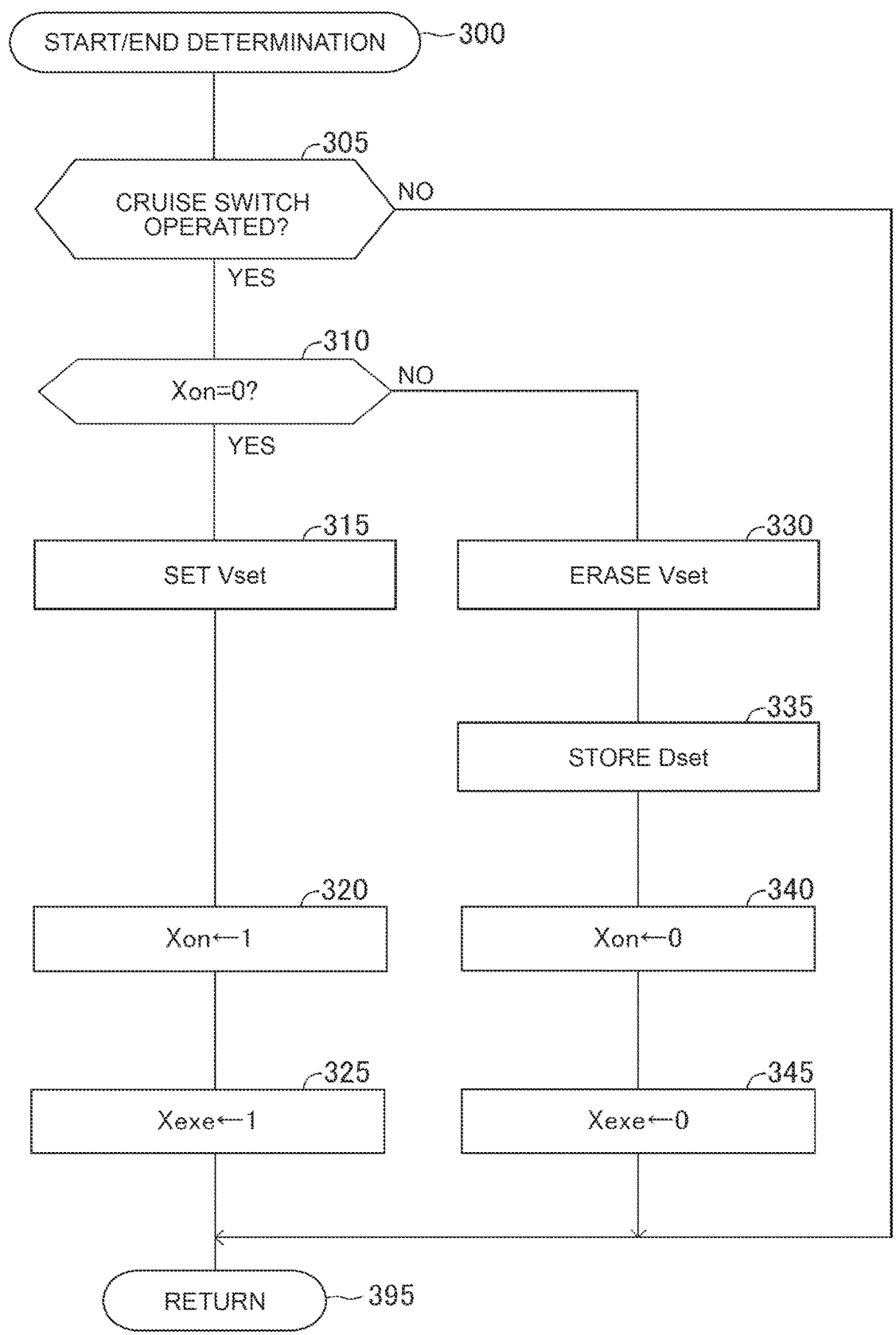
FIG. 3 is a flow chart of a start/end determination routine that is executed by CPU of ECU shown in FIG. 1.
Figure 4:
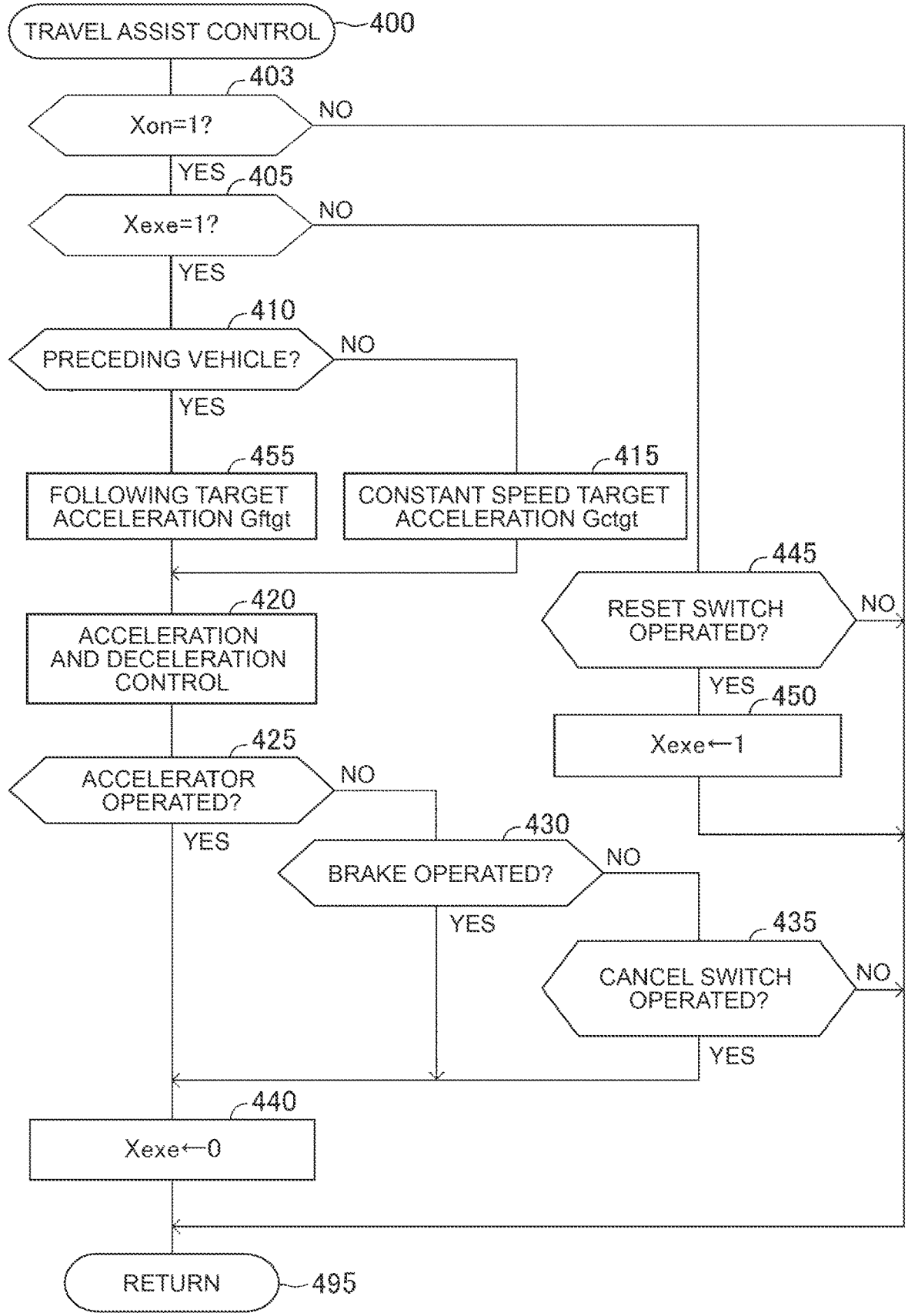
FIG. 4 is a flow chart of a travel assist control routine that is executed by CPU of ECU shown in FIG. 1.
Figure 5:
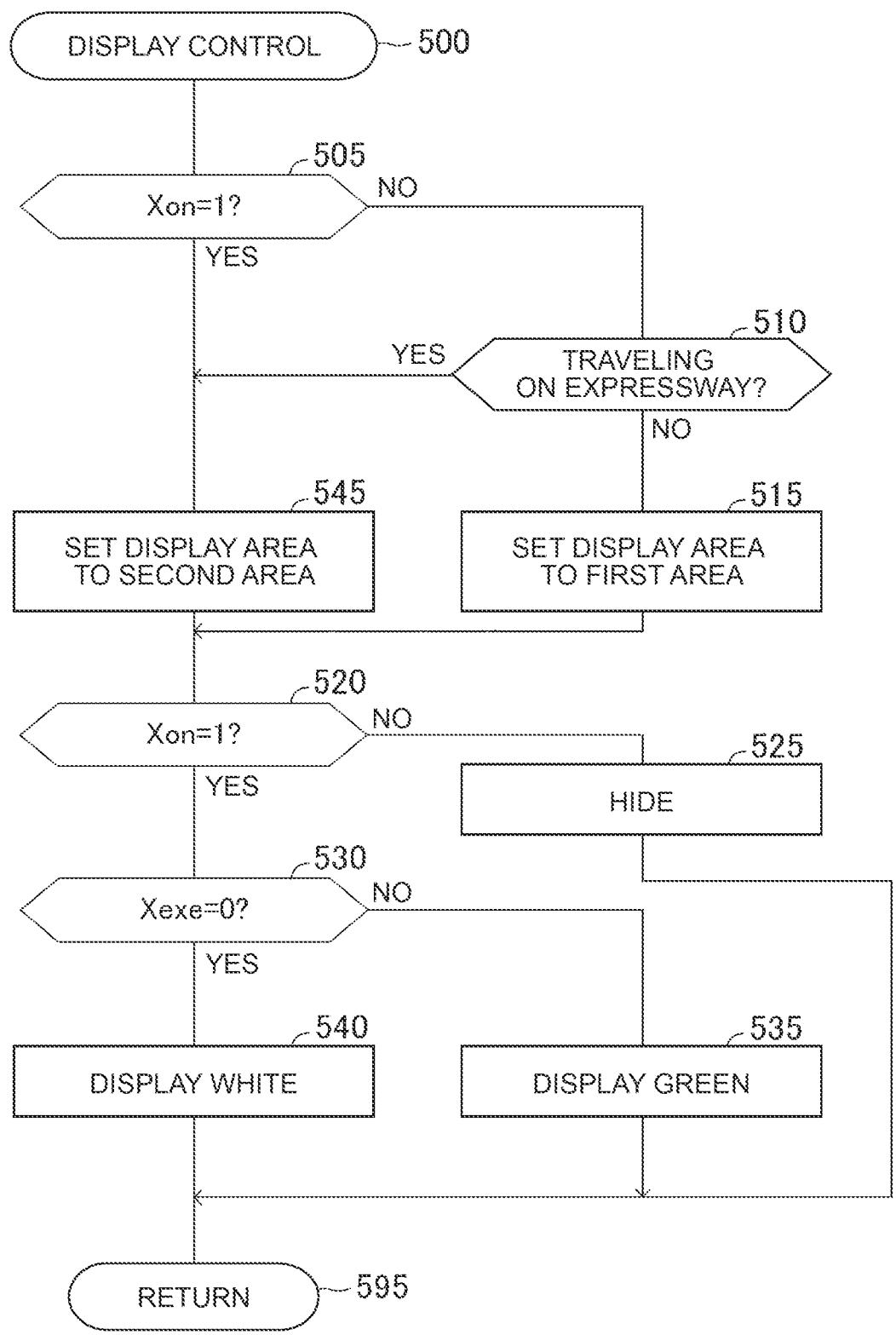
FIG. 5 is a flow chart of a display control routine that is executed by CPU of ECU shown in FIG. 1.

The CPU of the ECU 20 executes the routines shown by the flowcharts in FIGS. 3 to 5 every time a predetermined period of time elapses.
Start/End Judgment Routine Once the appropriate time point has arrived, the CPU starts the process from step 300 of FIG. 3 and, in step 305, the CPU determines whether the cruise switch 32 has been operated.

When the cruise switch 32 is operated, the CPU determines "Yes" in step 305. The process proceeds to step 310, and in step 310, the CPU determines whether the ON flag Xon is "1".

The ON flag Xon is set to "1" when the travel assist control starts, and is set to "O" when the travel assist control ends. Further, in the initial routine, the ON flag Xon is set to "0". The initial routine is executed by the CPU when an ignition-key switch (not shown) of the vehicle VA is changed from the off-position to the on-position.

When the ON flag Xon is "0", the CPU determines "Yes" in step 310 and performs steps 315 to 325.

Step 315: The CPU sets the set vehicle speed Vset specified by the driver.

The vehicle speed Vs when the driver operates a vehicle speed setting switch (not shown) is set to the set vehicle speed Vset. Therefore, the driver can set the set vehicle speed Vset by operating the vehicle speed setting switch when the vehicle speed Vs reaches a desired speed.

Step 320: The CPU sets the ON flag Xon to "1".

Step 325: The CPU sets the execution flag Xexe to "1".

The execution flag Xexe is set to "1" when the travel assist control is not interrupted in the execution period from the start to the end of the travel assist control, and is set to "0" when the travel assist control is interrupted in the execution period. In the initial routine, the execution flag Xexe is set to "0". After that, the process proceeds to step 395, and the CPU ends the routine once.

When the ON flag Xon is "1" when the process proceeds to step 310, the CPU determines "No" in step 310 and performs steps 330 to 345.

Step 330: The CPU deletes the set vehicle speed Vset.
Step 335: The CPU stores the currently set range Dset.
The driver can set the set distance Dset by operating a distance setting switch (not shown).

Step 340: The CPU sets the ON flag Xon to "0".
Step 345: The CPU sets the execution flag Xexe to "0".
After that, the process proceeds to step 395, and the CPU ends the routine once.

When the cruise switch 32 is not operated when the process proceeds to step 305, the CPU determines "No" in step 305. Then, the process proceeds to step 395, and the CPU ends the routine once.
Travel Assist Control Routine When the appropriate time point has arrived, the CPU starts the process from step 400 of FIG. 4 and determines in step 403 whether the ON flag Xon is "1". When the ON flag Xon is "0", the CPU determines "No" in step 403. Then, the process proceeds to step 495, and the CPU ends the routine once.

When the ON flag Xon is "1", the CPU determines "Yes" in step 403. Then, the process proceeds to step 405, and the CPU determines whether the execution flag Xexe is "1".

When the execution flag Xexe is "1", the CPU determines "Yes" in step 405. In this case, processing proceeds to step 410. In step 410, the CPU determines whether a preceding vehicle is present based on the image-data and the radar object-information.

The preceding vehicle is a vehicle that travels in the same lane as the lane in which the vehicle VA is traveling and is present in a predetermined range in front of the vehicle VA.

When there is no preceding vehicle, the CPU determines "No" in step 410 and performs steps 415 to 425.

Step 415: The CPU applies the set vehicle speed Vset and the vehicle speed Vs to the following Expression (1) to obtain a constant speed target acceleration Gtgt for matching the vehicle speed Vs with the set vehicle speed Vset.

$$Gctgt = k1 \times (Vset - Vs) \quad (1)$$

Note that k1 in Expression (1) is a predetermined gain (factor).

Step 420: The CPU controls the powertrain actuator 40 and the brake actuator 42 so that the acceleration G coincides with the constant speed target acceleration Gctgt.

Step 425: The CPU determines whether the driver has operated an accelerator pedal (not shown).

When the driver is not operating the accelerator pedal, the CPU determines "No" at step 425. In this case, processing proceeds to step 430. In step 430, the CPU determines whether the driver has operated a brake pedal (not shown).

When the driver is not operating the brake pedal, the CPU determines "No" at step 430. In this case, processing proceeds to step 435. In step 435, the CPU determines whether the driver has operated the cancel switch 34.

When the driver has not operated the cancel switch 34, the CPU determines "No" in step 435. In this case, processing proceeds to step 495. In step 495, the CPU ends the routine once.

When the driver operates the accelerator pedal when the process proceeds to step 425, the CPU determines "Yes" in step 425, and the process proceeds to step 440. When the driver operates the brake pedal when the process proceeds to step 430, the CPU determines "Yes" in step 430, and the process proceeds to step 440. When the driver operates the cancel switch 34 when the process proceeds to step 435, the CPU determines "Yes" in step 435, and the process proceeds to step 440. In step 440, the CPU sets the execution flag Xexe to "0". After that, the process proceeds to step 495, and the CPU ends the routine once.

When the CPU proceeds to step 405, the CPU determines "No" in step 405 When the execution flag Xexe is "O". In this case, processing proceeds to step 445. In step 445, the CPU determines whether the driver has operated the reset switch 36.

When the driver is not operating the reset switch 36, the CPU determines "No" at step 445. After that, the process proceeds to step 495, and the CPU ends the routine once.

When the driver operates the reset switch 36, the CPU determines "Yes" in step 445, and the process proceeds to step 450. In step 450, the CPU sets the execution flag Xexe to "1". After that, the process proceeds to step 495, and the CPU ends the routine once.

When there is a preceding vehicle when the process proceeds to step 410, the CPU determines "Yes" in step 410. In this case, processing proceeds to step 455. In step 455, the CPU applies the set vehicle speed Vset, the vehicle speed Vs, and the relative velocity Vr of the preceding vehicle to the following Expression (2) to acquire a following target acceleration Gftgt for matching the distance D with the set distance Dset.

$$Gftgt = ka1 \times (k2 \times (D - Dset) + k3 \times Vr) \quad (2)$$

Ka1, k2 and k3 in the above Expression (2) are predetermined gains (factors). Processing then proceeds to step 420. In step 420, the CPU controls the powertrain actuator 40 and the brake actuator 42 so that the acceleration G coincides with the following target acceleration Gftgt.

Display Control Routine

When the appropriate time point has arrived, the CPU starts the process from step 500 of FIG. 5 and determines in step 505 whether the ON flag Xon is "1".

When the ON flag Xon is "0", the CPU determines "No" in step 505, and the process proceeds to step 510. In step 510, the CPU determines whether the vehicle VA is traveling on the highway. As an example, the CPU determines that the vehicle VA is traveling on the highway for a period of time from detecting the entrance of the highway based on the camera image to detecting the exit of the highway based on the camera image. As another example, the CPU refers to the map data and determines that the vehicle VA is traveling on the expressway when the type of the road at the present position identified by GNSS receiver 26*a* is the expressway. As yet another example, the CPU may determine whether the vehicle VA is traveling on an expressway based on a communication history of an ETC card (not shown).

When the vehicle VA is not traveling on the highway, the CPU determines "No" at step 510 and performs steps 515 and 520.

Step 515: The CPU sets a display area for displaying the cruise status indicator light 54 to the first area 58.
Step 520: The CPU determines whether the ON flag Xon is "1".

When the ON flag Xon is "0", the CPU determines "No" in step 520, and the process proceeds to step 525. In step 525, the CPU does not display the cruise status indicator light 54. After that, the process proceeds to step 595, and the CPU ends the routine once.

When the ON flag Xon is "1", the CPU determines "Yes" in step 520, and the process proceeds to step 530. In step 530, the CPU determines whether the execution flag Xexe is "0".

When the execution flag Xexe is "1", the CPU determines "No" in step 530, and the process proceeds to step 535. In step 535, the CPU displays a green cruise status indicator light 54 in the display area. After that, the process proceeds to step 595, and the CPU ends the routine once.

On the other hand, When the execution flag Xexe is "0", the CPU determines "Yes" in step 530, and the process proceeds to step 540. In step 540, the CPU displays a white cruise status indicator light 54 in the display area. After that, the process proceeds to step 595, and the CPU ends the routine once.

When the ON flag Xon is "1" when the process proceeds to step 505, the CPU determines "Yes" in step 505, and the process proceeds to step 545. When the vehicle VA is traveling on the highway when the process proceeds to step 510, the CPU determines "Yes" in step 510, and the process proceeds to step 545. In step 545, the CPU sets the display area to the second area 60. The process then proceeds to step 520.

According to the device of the present disclosure, when either or both of the first condition and the second condition are satisfied, a display area for displaying the cruise status indicator light 54 is set in the second area 60. It is therefore possible to reduce the possibility of the driver being bothered by the cruise status indicator light 54 and increase the possibility of the driver being able to easily see the cruise status indicator light 54.

Modifications

In the above-described embodiment, when the value of the ON flag Xon is "0", the CPU does not display the cruise status indicator light 54 (step 525), but may display the cruise status indicator light 54 in a display mode that differs from the case where the value of the ON flag Xon is "1". That is, the mode of the cruise status indicator light 54 may be different between the case where the ON flag Xon is "1" and the case where the ON flag is "0".

In the above embodiment, the CPU displays the green cruise status indicator light 54 when the value of the execution flag Xexe is "1" when the value of the ON flag Xon is "1", and displays the white cruise status indicator light 54 when the value of the execution flag Xexe is "0", but the present disclosure is not limited thereto. When the value of the ON flag Xon is "1", the mode of the cruise status indicator light 54 may be different between the case where the value of the execution flag Xexe is "1" and the case where the value is "0".

Note that the configuration in which the mode of the cruise status indicator light 54 differs between the case where the execution flag Xexe is "1" and the case where the execution flag Xexe is "0" is not an essential configuration of the device 10. The mode of the cruise status indicator light 54 may be the same as the mode when the execution flag Xexe is "1" and the mode when it is "0".

The display device 44 need not necessarily be mounted on the instrumental panel, but need only be disposed at a position visible to the driver. For example, the display device 44 may be a head-up display.

The device 10 is applicable to vehicles such as engine vehicles, hybrid electric vehicles, plug-in hybrid vehicles, fuel cell electric vehicles, and battery electric vehicles.

What is claimed is:

1. A vehicle display control device comprising:
   a control unit configured to perform travel assist control for controlling a vehicle to travel in such a manner that a vehicle speed indicating a speed of the vehicle matches a preset set vehicle speed or that the vehicle follows a preceding vehicle; and
   a display device configured to display, in a preset display area, a status display element related to an operating status of the travel assist control, wherein
   the control unit is configured to
      set the display area to a first area when neither a first condition nor a second condition is satisfied, the first condition being that the travel assist control is on, and the second condition being that the vehicle is traveling on an expressway, and
      set the display area to a second area when either or both of the first condition and the second condition are satisfied, and
   the second area is set at a position that is more visible to a driver than the first area.

2. The vehicle display control device according to claim 1, wherein the control unit is configured to
   when controlling the vehicle to follow the preceding vehicle by the travel assist control, control the vehicle to travel in such a manner that a distance between the preceding vehicle and the vehicle matches a preset set distance, and display a setting display element for the set vehicle speed and the set distance in the second area.

3. The vehicle display control device according to claim 1, wherein the control unit is configured to change a mode of the status display element between when the first condition is satisfied and when the first condition is not satisfied.

4. The vehicle display control device according to claim 1, wherein the control unit is configured to when a predetermined interruption condition is satisfied while the travel assist control is on, interrupt the travel assist control until a predetermined resume condition is satisfied after the interruption condition is satisfied, and change the mode of the status display element between when the travel assist control is interrupted while the travel assist control is on and when the travel assist control is not interrupted.

5. The vehicle display control device according to claim 1, wherein the control unit is configured to perform the travel assist control during a period from when a predetermined switch is operated while the travel assist control is not on until the switch is operated again.

* * * * *